United States Patent
Richman et al.

(10) Patent No.: US 10,210,232 B2
(45) Date of Patent: Feb. 19, 2019

(54) AUTOMATED STAGED DATA MIGRATION

(71) Applicant: SkyKick, Inc., Seattle, WA (US)

(72) Inventors: Evan Richman, Seattle, WA (US); Todd Schwartz, Seattle, WA (US); Trent Robert Schwartz, Seattle, WA (US); Bradley Younge, Denver, CO (US); John Dennis, Oakland, CA (US); Roger Neil Moore, Seattle, WA (US); Christopher Rayner, Seattle, WA (US)

(73) Assignee: SKYKICK, INC., Seattle, WA (US)

( * ) Notice: Subject to any disclaimer, the term of this patent is extended or adjusted under 35 U.S.C. 154(b) by 545 days.

(21) Appl. No.: 14/873,060

(22) Filed: Oct. 1, 2015

(65) Prior Publication Data

US 2016/0098470 A1    Apr. 7, 2016

Related U.S. Application Data

(60) Provisional application No. 62/058,608, filed on Oct. 1, 2014.

(51) Int. Cl.
| | | |
|---|---|---|
| *G06F 15/16* | (2006.01) | |
| *G06F 17/30* | (2006.01) | |
| *H04L 29/08* | (2006.01) | |
| *H04L 12/58* | (2006.01) | |
| *H04L 29/12* | (2006.01) | |

(52) U.S. Cl.
CPC ........ *G06F 17/30575* (2013.01); *H04L 51/04* (2013.01); *H04L 51/22* (2013.01); *H04L 67/306* (2013.01); *H04L 67/325* (2013.01); *H04L 67/34* (2013.01); *H04L 61/1511* (2013.01)

(58) Field of Classification Search
CPC ........................................................ H04L 51/22
USPC .......................................................... 711/162
See application file for complete search history.

(56) References Cited

U.S. PATENT DOCUMENTS

| | | |
|---|---|---|
| 7,484,208 B1 | 1/2009 | Nelson |
| 7,917,713 B2 | 3/2011 | Elliott |
| 8,275,748 B2 | 9/2012 | Nagarajan |
| 8,386,731 B2 | 2/2013 | Mashtizadeh |
| 8,661,088 B2 | 2/2014 | Alarid |

(Continued)

FOREIGN PATENT DOCUMENTS

CN        102103629 B      6/2011

OTHER PUBLICATIONS

NPL—Staged Exchange Migration—Exchange Online Help, retrieved from https://web.archive.org/web/20140608171212/https://technet.microsoft.com/en-us/library/jj898486(v=exchg.150).aspx.*

(Continued)

*Primary Examiner* — Douglas B Blair
*Assistant Examiner* — Ishrat Rashid
(74) *Attorney, Agent, or Firm* — Kilpatrick Townsend & Stockton LLP

(57) ABSTRACT

Systems, methods, and apparatuses can provide staged migration from one or more user accounts from a source system to a destination system using an application local to the source systems. The automated staged data migration can provide coordinated staged data migration of large amounts of data in a single automated process. The system can provide automated and remotely controlled staged migrations of data that may perform source system type detection and work with multiple types of systems.

18 Claims, 11 Drawing Sheets

(56) References Cited

U.S. PATENT DOCUMENTS

| | | |
|---|---|---|
| 8,701,103 B1 | 4/2014 | Hsu |
| 2009/0327632 A1 | 12/2009 | Glaizel |
| 2012/0265726 A1* | 10/2012 | Padmanabhan ....... G06F 17/303 707/602 |
| 2014/0149517 A1* | 5/2014 | Greinhofer ............. H04L 51/22 709/206 |
| 2015/0019488 A1 | 1/2015 | Higginson |
| 2015/0058289 A1 | 2/2015 | Do |
| 2015/0100655 A1* | 4/2015 | Pouzin ................. G06F 9/5011 709/206 |
| 2015/0178014 A1 | 6/2015 | Nelson |

OTHER PUBLICATIONS

"Successful Data Migration," An Oracle White Paper, Oct. 2011, 15 pages.

"Real-time Data Migration for Windows and NetApp Systems," Product Data Sheet, PEER Software, 2012, [online], retrieved from the internet URL: < http://www.peersoftware.com/products/sync-backup/peersync-migration-edition.html>, 2 pages.

"How to ensure incoming emails don't get lost when migrating to new server?" Stack Exchange, Super User Slog, posted on-line Mar. 3, 2013, retrieved from the internet URL: http://superuser.com/questions/560138/how-to-ensure-incoming-emails-dont-get-lost-when-migrating-to-new-server, 2 pages.

"tcVISION: Enterprise ETL and Real-Time Data Replication Through Change Data Capture," Product Data Sheet, Treehouse Software, 2015, [online], [retrieved on Sep. 24, 2015], retrieved from the internet URL: < http://www.treehouse.com/tcvision.shtml>, 2 pages.

"Data Migration and ETL (Extract, Transform, and Load)," Product Data Sheet, Information Builders, 2015, [online], [retrieved on Sep. 24, 2015], retrieved from the Internet URL: < http://www.informationbuilders.com/products/webfocus/data_warehousing>, 3 pages.

* cited by examiner

Staged Migration Selection 2 of 2

| | | |
|---|---|---|
| ☑ | peter.gibbons@cloud55510.com | 543,000 |
| ☑ | michael.bolton@cloud55510.com | 493,000 |
| ☑ | samir.nagheenanajar@cloud55510.com | 365,000 |
| ☐ | bob.slydell@cloud55510.com | 284,000 |
| ☐ | bob.porter@cloud55510.com | 124,000 |
| ☐ | lorem.ipsum.2@cloud55510.com | 96,000 |
| ☐ | peter.gibbons2@cloud55510.com | 923,000 |
| ☐ | michael.bolton2@cloud55510.com | 854,000 |
| ☐ | samir.nagheenanajar2@cloud55510.com | 785,000 |
| ☐ | lawrence2@cloud55510.com | 654,000 |
| ☐ | milton.waddams2@cloud55510.com | 543,000 |
| ☐ | bill.lumbergh2@cloud55510.com | 463,000 |
| ☐ | tom.smykowski2@cloud55510.com | 365,000 |
| ☐ | dom.portwood2@cloud55510.com | 284,000 |
| ☐ | bob.slydell2@cloud55510.com | 124,000 |
| ☐ | peter.gibbons3@cloud55510.com | 96,000 |
| ☐ | michael.bolton3@cloud55510.com | 923,000 |
| ☐ | samir.nagheenanajar3@cloud55510.com | 854,000 |
| ☐ | lawrence3@cloud55510.com | 785,000 |
| ☐ | milton.waddams3@cloud55510.com | 684,000 |
| ☐ | bill.lumbergh3@cloud55510.com | 543,000 |
| ☐ | tom.smykowski3@cloud55510.com | 452,000 |
| ☐ | dom.portwood3@cloud55510.com | 365,000 |

Add a staged group

Showing 100 of 360    PREV  NEXT    Page 1 2 3 4

FIG. 7 (CONT.)

AUTOMATED STAGED DATA MIGRATION

CROSS-REFERENCES TO RELATED APPLICATIONS

The present application is a non-provisional of and claims priority to U.S. Provisional Application 62/058,608, entitled "Automated Staged Data Migrations," filed on Oct. 1, 2014. The present application is also related to U.S. Provisional Application 62/058,605, entitled "Optimizing Data Migration Processes," filed on Oct. 1, 2014, and to concurrently filed U.S. Patent Application entitled "Optimizing Data Migration Processes," which claims priority to U.S. Provisional Application 62/058,605. The entire content of the above applications are hereby incorporated by reference for all purposes in its entirety.

BACKGROUND

The present disclosure relates to migrating data from a source system in stages to a destination system in an automated fashion using a remote migration controller that is not local to the source system.

Migration of large amounts of data in one effort, as opposed to completing the process in stages, may take an undesirably long time and may place a heavy burden on technical support services when even a small fraction of the data migration results in errors. In the case of a large-scale email and data migration, there may also be a heavy impact on the staff in charge of setting up email and data on each end user's computer. These problems are highlighted in the following examples, A company may have, for example 2500 employees around the world in 20 different offices, and every employee in the company is to have their email and associated account data (e.g. contact cards, calendar appointments, distribution groups, permissions, etc.) migrated from one system (hereinafter referred to as a "source system") to a destination system. If this migration were performed in a single effort, limitations on bandwidth and system resources would likely create bottlenecks that would extend the total amount of time spent migrating the data to an undesirable length. Further, the logistics of migrating 2500 people in different times zones may be complicated in that some of them may be working on their computers while the migration is occurring, which could cause errors or unwanted interruptions. And, if even a small percentage of users experience errors or interruptions during the migration, it could still be a large enough group to quickly overwhelm the technical support staff in charge of managing the migration, further extending the time and expense of completing the job. The task of setting up every end user's email and data alone could be enough to overload the technical support ("IT") staff.

The problems outlined above may be alleviated by performing data migrations in stages, e.g., by migrating subsets of data at different times until everything is moved to the destination system. Staged migrations, however, may require those who are tasked with carrying out the staged migration (hereinafter referred to as "partners") to create in advance batch files or other scripts that execute commands to implement the migration. This can require a wealth of information from both the source and destination email and data systems, can be very time consuming, and can leave much room for error.

Also, with many migration jobs, remote access cannot be attained to run the above-described command scripts, and in those scenarios, partners may generally be on the premises of the source system to execute the commands, in a time-sensitive fashion (this is sometimes referred to as a "hybrid" migration). Many systems are behind firewalls or have other access restrictions for remote access. In order to do this, work may need to be done to upgrade the source system and an additional server or servers may need to be bought and installed on the premises of the source system. This can create additional cost and time to carry out the migration, and also can increase complexity and thus can create more room for error. For example, in a staged email migration where remote access is not possible, partners could have to be on premises to manually configure every single mailbox at the appropriate time. The partner could need to set up mail routing rules before migration time, which can be problematic because it may be difficult to get end users switched over to the destination system fast enough to avoid emails being undelivered while the migration is happening. Mail routing rules can comprise forwarding rules to forward emails from one place to another.

Another challenge with staged migrations is that there are multiple kinds of source systems for managing data including but not limited to email, files, calendaring (e.g. Microsoft Exchange®, Google®, etc.). Each of these systems has different commands that need to be executed against them in order to perform the migration. Staged migration tools often do not have the ability to detect which type of source system is present and do not have the flexibility to work with the multiple systems that may be detected (i.e. run the appropriate commands for multiple systems that may be detected).

Therefore, it is desirable to provide improved systems and methods of conducting staged migrations to address the above and other problems.

BRIEF SUMMARY

Embodiments can provide staged migration from one or more user accounts from a source system to a destination system using a migration controller server. The migration controller server can communicate with the source system, the destination system, and with a migration engine that performs the migration of user accounts, and optionally of other associated data. The migration controller server can receive instructions to migrate the user accounts in a plurality of stages, with different stages migrating different accounts. The migration controller server can control timing of actions to be performed at transitions between stages, e.g., to ensure a complete and seamless migration for all user accounts. For instance, the completeness can be ensured by implementing forwarding rules at a specific time. A seamless transition can be ensured by configuring user computers so that any new actions are directed to the destination system at the time the migration happens for that user. Accordingly, embodiments can provide coordinated staged data migration of large amounts of data in a single automated process.

As part of controlling the staged migration, the migration controller server migration can send commands to a migration engine to begin replicating the data of a first set of one or more user accounts from the source system to the destination system. The migration controller server can receive a completion signal from the migration engine, where the completion signal indicates that the first set of one or more user accounts have been migrated. In response to the completion signal, the migration controller server can transmit forwarding commands to the source system to create forwarding rules to forward future data for the first set of one or more user accounts to the destination system. As an example, new data can be received by the source system after the first set of one or more user accounts have been migrated to the destination system, and the forwarding rules can specify that the new data is to be forwarded to the destination system. In response to the completion signal, the migration controller server can also send commands to end user system computers associated with the first set of user accounts to reconfigure the end user system computers to connect to the destination system. For example, links within applications on the end user system computers can be updated to point to the destination system.

Other embodiments are directed to systems, portable consumer devices, and computer readable media associated with methods described herein.

A better understanding of the nature and advantages of embodiments may be gained with reference to this detailed description and the accompanying drawings.

BRIEF DESCRIPTION OF THE DRAWINGS

FIG. 7 is an example screenshot of a GUI for tracking a staged migration according to various embodiments.

DETAILED DESCRIPTION

Embodiments provide systems and methods for automated data migration of user accounts in stages, from a source system to a destination system using a migration controller server that is not local to the source system. The a migration controller server can be part of a migration controller environment that includes applications (e.g., interfaces and management applications), which can execute on the migration controller server. A server can refer to multiple computers.

In some embodiments, the migration controller server (also referred to as a "migration controller") is used to assist with carrying out the staged migration of data. In various embodiments, a user interface is utilized to configure migration details and send and receive communications. Migration details can comprise for example, the details about when the migration is to occur, when the final synchronization is to take place, how many stages are to occur, which accounts are in each stage, maximum amounts of data, etc. To orchestrate the migration, some rules may be established with the destination system and preconfigured command scripts may be sent to an application on the source system or to an application program interface ("API") associated with the source system. These rules/commands can be sent at specific times as part of the orchestratation. Commands can also be sent to client applications on end user devices so as to configure the client applications at specific times to interact with the destination system, and not the source system. In this manner, the client applications can have their underlying functionality changed once the user accounts have moved to the destination system. Accordingly, embodiments can provide automated and remotely controlled staged migrations of data that may perform source system type detection and work with multiple types of systems.

Figure 1:
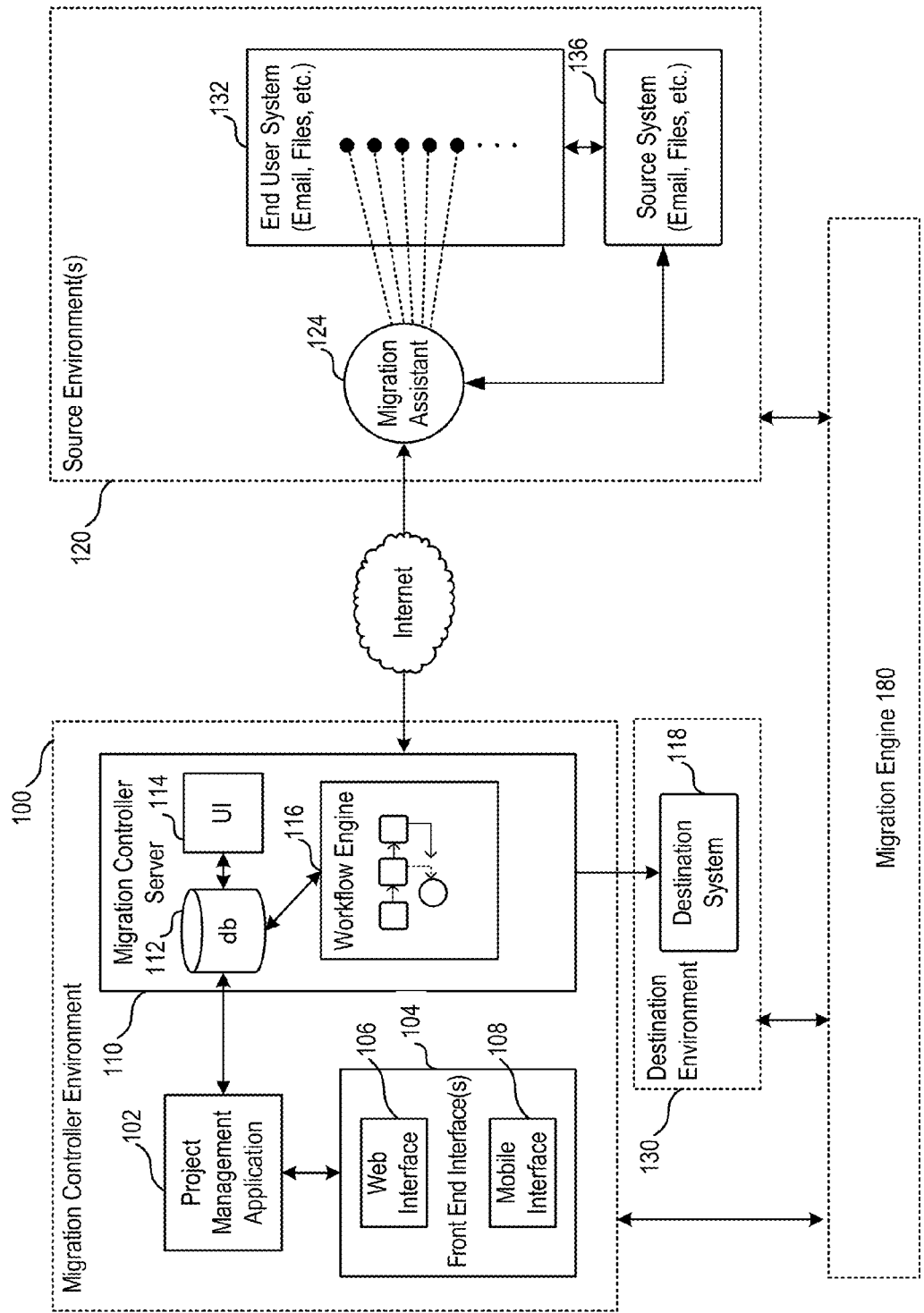
FIG. 1 is a schematic diagram of the architecture of a system for automated, remotely-controlled staged migrations of data from a source system according to various embodiments.

Section I describes a system that includes a migration controller environment that may be used to conduct a staged migration. Section II describes the use of an order planning tool to specify the desired migration schedule via a GUI. Section III describes a method of performing a staged migration using the elements of the system as shown in FIG. 1 Section IV describes the use of an order planner and user interfaces to receive operator inputs related to a staged migration for data to be migrated in stages, as well as the beginning and end times for the migration of each staging group. Section V describes the commands for migration of user data from a source system to a destination system via a workflow engine of a migration controller. Section VI describes an example computer system usable with system and methods described.

I. System

FIG. 1 is a schematic diagram of the architecture of a system for automated, remotely-controlled staged migrations of data (e.g., emails or other files) from a source system according to various embodiments. Embodiments can migrate data from a source system 136 in stages to a destination system 118 in an automated fashion using a migration controller server 110 that is not local to source system 136.

A project management application 102 may be utilized via a front end interface 104 and/or an administrative user interface 114 to configure various migration details, as well as send and receive communications. Project management application 102 and front end interface 104 may execute on a same computer or a different computer than migration controller server 110. In various embodiments, front end interface 104 may comprise a web interface 106 or a mobile interface 108, and may be used by a customer to provide instructions for and execute a staged migration.

Front end interface UI 114 may be used by support personnel to make changes at migration controller server 110. To orchestrate the migration, a workflow engine 116 may establish various rules with destination system 118 and send preconfigured command scripts to a migration assistant 124 (e.g., an application executing on the source system 136). Migration assistant 124 can executing on a local device within a local network that includes the source system. As another example, migration assistant 124 can be constructed as an API available on the source system. Commands can also be sent to an application on end user devices of end user system 132.

End user system 132 may comprise an individual person's computing device, for example a laptop, desktop, mobile device or similar. Source system 136 may comprise an email and/or directory service and/or data server or servers that can contain the emails, files, and other data for end user systems. Migration assistant 124 may be downloaded to the same source environment 120 as source system 136 in that it can be local to the location of the data to be collected and migrated. Migration assistant 124 can make changes to source system 136 to aid in the migration process. The migration assistant can also collect various pieces of data including but not limited to the accounts on a source system, and any metadata related to the source environment needed to perform a migration.

In some embodiments, a project management application 102 may be used to manage and monitor data migrations; the project management application 102 may be web-based or application-based. A front end interface 104 is the user-facing front end of the project management application 102. The front end interface 104 may include a web interface 106 and/or a mobile interface 108. An administrative user interface (UI) 114 may be used to provide administrative access to the project management application 102, for example, to allow for additional permissions to manage a migration.

In certain embodiments, migration controller 110 may include a database 112, UI 114, and workflow engine 116. Migration controller 110 can receive inputs from an order planning tool (not shown) and use the inputs to direct a staged migration, e.g., by sending time-sensitive commands to other system components via a migration engine 180, by sending and receiving communications, by connecting to destination system 118 to create rules to follow via the migration engine 180, and other actions. The commands may be time-sensitive in the sense that they may need to be received within a certain timeframe in order for migration to proceed properly.

Communications may be "autogenerated" by migration controller 110, depending on various attributes collected from source system 136 or input into the order planning tool. For example, different email messages ("emails") may be generated and sent to those whose data can be migrated (e.g., end users) depending on various factors, such as whether or not the end user provided their password, whether the end user's password was changed before the final migration time, whether the end user was designated as a customer point-of-contact, etc. Depending on these factors, different email messages can be generated and sent to the end user. Communications (e.g., email messages, facsimile, text message, etc.) may also be generated and sent to end users that explain the migration project and instructing them to take various steps (e.g. visit a website and provide their source system 136 mailbox credentials and other information, such as name, phone number, title, etc.). Communications may also be sent to partners or others.

As discussed above, for migrations of some types of source systems 136, some embodiments also include a migration assistant 124, which may be downloaded to the same local area network 120 as the source system 136 (e.g., local to the location of the data to be collected and migrated). Migration assistant 124 can make changes to the source system 136 to streamline the migration. Migration assistant 124 can gather data about source system 136, receive commands from migration controller 110, and performs those commands. Such commands may improve the quality and accuracy of a migration by allowing the destination environment 130 to be configured in such a way that it mimics the source environment 120 more closely than would otherwise be achievable without a physical presence at the source system 136. Destination environment 130 can comprise a data storage or directory system or similar for email, calendaring, and other data. Further details of migration assistant 124 can be found in patent applications referenced above, entitled "Optimizing Data Migration Processes."

Some embodiments include an application ("End User System Setup Assistant") that may be downloaded to end user systems 132 (e.g. desktop, laptop computer, mobile device) by, for example, the end users. The End User System Setup Assistant can help the end user to switch from using the source system 136 to a destination system 118, for example for their email, data storage, and calendaring service. In some embodiments, the End User System Setup Assistant is used to make some configuration changes to the source system 136 when a user's data is being migrated as part of a stage in a staged migration from source system 136 to the destination system 118. For example, the End User System Setup Assistant may create system settings, such as a registry setting to block source system 136 from performing an auto-discovery process that would require extra time and expense to correct. The End User System Setup Assistant may also reconfigure source system 136 so that a new profile is created and inbound data is directed to destination system 118.

Each end user system may have an assistant program installed on it to aid in migration. This assistant can check to see that each end user system has the proper operating system patches installed, has enough disk space, and collects an inventory of each end user system it is installed on. Once the migration from a source system to a destination system is complete, the assistant may point the end user system to use the new source system, create any new profile data, and configure the end user system as needed to complete the migration. Further details about an End User System Setup Assistant can be found in U.S. Patent Publication No. 2013/0212200, entitled "Migration Project Automation, e.g., Automated Selling, Planning, Migration And Configuration Of Email Systems," which is incorporate by reference in its entirety.

This setup assistant can configure the source system to enable proper migration, e.g., based on commands received from the migration controller server. The setup assistant can be installed on each end user system. It may perform a variety of pre-readiness checks to make sure the end user system is properly configured for migration. Some pre-readiness checks include making sure that the proper version of an email client is installed, that the operating system of the end user device has the proper patches or service packs installed, that the processor of the end user system is powerful and fast enough and that there is enough memory and disk space to perform the migration. The setup assistant may also collect an inventory of end user system characteristics, for example the operating system, disk space, memory, and users.

The setup assistant can perform configuration changes to point to the end user system to use the destination system instead of the source system. For example, the assistant may configure the mail client to point to the destination system instead of the source system. Thus, the reconfigure commands can instruct the setup assistant to point change one or more settings of one or more client applications (e.g., other than an e-mail client) to point to the destination system.

The assistant may create a profile within the mail client that specifies the desired changes. In order to create the profile, the assistant may need user credentials, such as a username and password for the end user system accounts. The assistant may automate the usage of the credentials such that they are used in a way that is not visible to the end user or behind the scenes. The new profile may also contain information such as the email signatures, auto complete names and addresses, and any datastores, for example, a .pst file, and any other pertinent settings or data. The assistant may also change certain end user system settings in order to complete the migration.

The setup assistant can create the new profile in advance of migration, and when it comes time to migrate, the new profile can be switched, to for example switch the mail client to use the destination system instead of the source system. By having the new profile ready, the switchover to the destination system may be seamless and unnoticeable for the end user. The new profile may also be sent to the destination system when appropriate.

II. Order Planning Using Migration Stages

In some embodiments, an order planning tool of migration controller environment 100 may be accessed via a project management application 102 using an interface, such as web interface 106 or mobile interface 108, which gives partners the ability to delineate multiple stages for a migration. Project management application 102 can contain the logic that is used to manage the migration process. The mobile interface may be better suited for mobile devices, and it can contain the same logic and interfaces as the web interface.

As an example for planning a staged migration, six total stages may be used to migrate the desired data from Company A's source system to a destination system. Project management application 102 can specify what data can be migrated during each stage (e.g. the first stage can include the email accounts for the 90 employees in Company A's New York office), and can specify when the migration of each staging group and the entire migration can begin and end (e.g. the first staging group can begin and end on January $1^{st}$ and January $10^{th}$, respectively, and the entire migration can begin and end on January $1^{st}$ and January $30^{th}$, respectively). See FIGS. 5-7 for example graphical user interface (GUI) "wireframes" and screenshots. A stage may comprise moving data from a single user account or many user accounts.

After a partner configures the migration using the order planning tool, migration controller 110 can receive the configuration inputs and translates them into commands to orchestrate the migration. For example, the migration controller 110 can communicate with the 90 employees in the New York office via for email on January $1^{st}$, providing them directions and soliciting information such as their email login name and password, and in some cases prompts employees to download the migration assistant 124 to their device. The email can contain links or similar to enable download of the migration assistant 124 to their device. The software application hereinafter referred to as a "Migration Assistant" is described in more detail in the concurrently filed patent application titled "OPTIMIZING DATA MIGRATION PROCESSES," the entire contents of which is herein incorporated by reference.

An example migration schedule desired by Company A might consist of the following requirements. Entire migration completion date: January 30. Stage 1: begin January 1 and end January 10. Stage 2: begin January 7 and end January 17. Stage 3 (final stage): begin January 25 and end January 30. The order management tool may be used to specify the above migration schedule. Once the order management tool is used to enter this information, the information can be sent to the project management application, which can use the workflow engine to schedule the appropriate commands to be executed at the appropriate times.

In some embodiments, during stage 1, from January 1 to January 10 at 5 PM, the email messages of some users would be migrated (also referred to as copied or replicated) from the source system 136 to the Destination System 118, but no changes to the source system 136 or end user computers 132 would be made during that time. On January 10 at 5 PM, commands scheduled by the migration controller server 110 could be sent to the Migration Assistant 124 to establish forwarding rules at the source system 136, so that any email that arrives after 5 PM is forwarded to the correct mailbox at the destination system 118. Also at 5 PM, commands are sent to the End User Systems 132 involved in Stage 1 so that their email clients are reconfigured to connect to their mailbox on the destination system 118. The commands may be scheduled in the workflow engine to be executed at the times desired, using for example, a timing mechanism.

The timing mechanism can include logic that specifies action to be performed at specific times, e.g., in response to a completion signal. As another example, a timing mechanism can use a clock signal to determine when a specified amount of time has passed, e.g., since a start signal that begins a migration of a user account or a stage.

The process described above occurs for stages 2 through n (n being the final stage) at their respective scheduled times. At the completion of the final stage, migration controller 110 can send commands to the migration assistant 124 and/or to any other applications or devices to perform any finalization steps. For example, if source system 136 is a Microsoft Exchange Server, then the finalization steps could comprise turning off Outlook Anywhere® and reconfiguring Autodiscover settings), and the MX record (a type of resource record in the Domain Name System that specifies a mail server responsible for accepting email messages on behalf of a recipient's domain) can be updated to point to the destination system 118.

III. Staged Migration

Staged migration can provide the migration of one or more subsets of accounts or subsets of data from a source system to a destination system. While migration is ongoing, subsets of the data from the source system may still reside on the source system, while other subsets of the data can reside on the destination system. By coordinating the data migration, the source and destination systems can maintain normal operations.

A. Method

Figure 2:
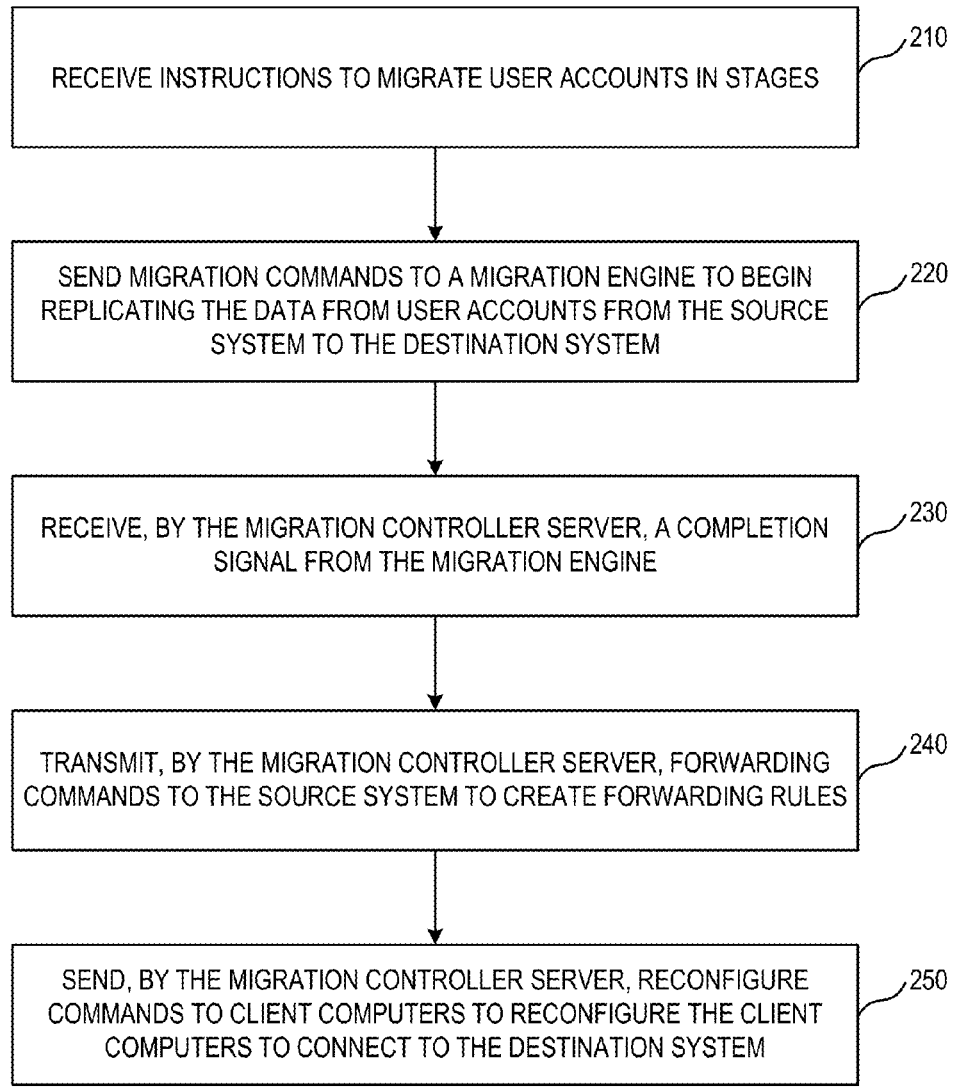
FIG. 2 is a flowchart of a method 200 of staged migration of data from a source system to a destination system according to various embodiments.

FIG. 2 is a flowchart of a method 200 of staged migration of data from one or more user accounts of a source system to a destination system according to various embodiments. Method 200 may be implemented by elements of a migration controller environment, e.g., in communication with a migration assistant, as seen in FIG. 1. The staged migration may be part of a migration project, or be the entire migration project.

At block 210, instructions are received to migrate data from a plurality of user accounts from a source system to a destination system in a plurality of stages. As an example, the instructions can be received via an order and planning tool. These plurality of accounts can comprise a subset of the user accounts on the source system. The instructions may be received by a migration controller server, such as migration controller server 110. Each of the plurality of stages can migrate one or more user accounts from the source system to the destination system. Each stage can have a start time and an end time.

At block 220, at a start time for the stage, the migration controller server can send migration commands to a migration engine (e.g., migration engine 180) to begin the process of replicating the data for the one or more user accounts from the source system to the destination system. The start time can correspond to the beginning of the migration project, and the stage can be the first stage. A trigger for the first stage can be a communication from a migration assistant that any changes to the source system have been implemented and the migration is ready. If the stage is a subsequent stage, a trigger for the start of the next stage can be a completion signal for the previous stage. In various embodiments, the start times can correspond to the time of the trigger, or some predetermine time or number of operations after the trigger.

At block 230, migration controller server can receive a completion signal from the migration engine at an end time for migration that one or more user accounts have been migrated from the source system to the destination system. This completion signal can notify the migration controller server that data from one or more user accounts has been transferred, and that the process can continue for a next subset of one or more user accounts.

At block 240, the migration controller server can forward commands to source system to create forwarding rules to forward future data for the one or more user accounts to destination system in response to the completion signal. These forwarding rules can ensure that future data and settings changes directed to the one or more accounts is reflected at the destination system. For example, new data can be received by the source system after the first set of one or more user accounts have been migrated to the destination system, and this new data can be forwarded to the destination system.

At block 250, the migration controller server can send commands to client computers (e.g., end user systems 132) associated with the one or more user accounts to reconfigure the client computers to connect to the destination system. Each one of the user accounts may finish transferring data at different times. Once each user account has been fully transferred, then commands can be sent to reconfigure the corresponding client computer. The migration controller server can then be ready to begin the process again with another subset of user accounts, if other subsets are to be transferred from the source system to the destination system.

B. Block Diagram

Figure 8:
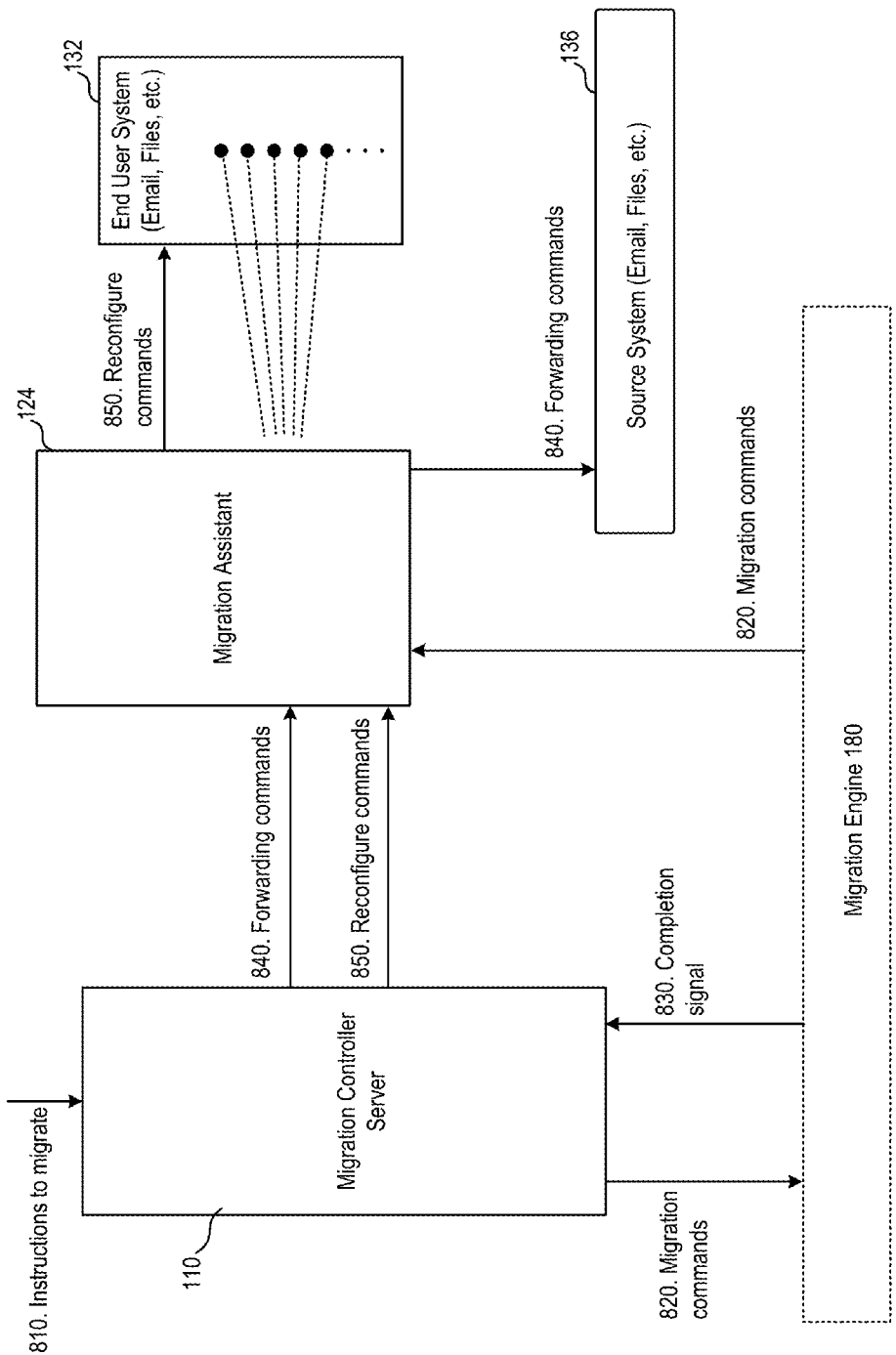
FIG. 8 is a flow diagram of a staged migration of data from a source system to a destination system according to various embodiments.

FIG. 8 shows a block diagram a staged migration of data from a source system to a destination system according to various embodiments of the present invention. Reference labels in FIG. 8 correspond to elements of FIG. 1.

At step 810, the Migration Controller Server 110 receives instructions to migrate data from a plurality of user accounts from a source system to a destination system in a plurality of stages. These plurality of accounts can comprise a subset of the user accounts on the source system. Each of the plurality of stages can migrate one or more user accounts from source system 136 to a destination system. Each stage also can have a start time and an end time, and various other points of migration specified.

At step 820, at a start time for a stage, Migration Controller Server 110 can send migration commands to Migration Engine 180 to begin the process of replicating the data for the one or more user accounts from source system 136 to Destination System 118. The migration commands can be sent to Migration Engine 180, which sends them to Migration Assistant 124

At step 830, at an end time for migration, when one or more user accounts have been migrated from source system 136 to a destination system, Migration Controller Server 110 can receive a completion signal from Migration Engine 180. This completion signal can notify the Migration Engine 180 that data from one or more user accounts has been transferred, and that the process can continue for a next subset of user accounts.

At step 840, once one or more completion signals are received, the Migration Controller Server 110 can send forwarding commands to source system 136 via the Migration Assistant 124 to create forwarding rules to forward future data for the one or more user accounts to a destination system. These rules can ensure that future data and settings changes directed to the one or more accounts is reflected at a destination system.

At step 850, Migration Controller Server 110 can send commands to End User Systems 132 via Migration Assistant 124, that are associated with the one or more user accounts to reconfigure the End User Systems 132 to connect to a destination system. Each one of the user accounts may finish transferring data at different times. Once each account has been fully transferred, then commands need to be sent to reconfigure each of the End User Systems 132. The system would then also be ready to begin the process again with another subset of user accounts should there be any accounts that need to be transferred from a source system to a destination system.

IV. Order Planner/User Interface

In some embodiments, the Project Management Application 102 includes an order planning tool (shown in FIGS. 5-7), which may receive user inputs related to a staged migration via a Front End Interface 104 and/or administrative UI 114 including, but not limited to, designations of data to be migrated in each stage, as well as the beginning and end times for the migration of each staging group. For example, a user may select which email accounts and associated data should be migrated during each stage, and in doing so can filter them from a presentation of the data in the source system 136 by various criteria, such as email distribution groups, office location, etc.

In an example use case, a user filters the list of email accounts in the source system 136 to only show the accounts associated with offices in New York City. The user may select those accounts for migration as one staging group, and may also input a start time (e.g., a time when to begin sending out communications to the people in that group telling them what they need to do to make the migration go smoothly) and a stop time (e.g., a time when everyone in the group can be migrated from the source system 136 to the Destination System 118).

Figure 5:
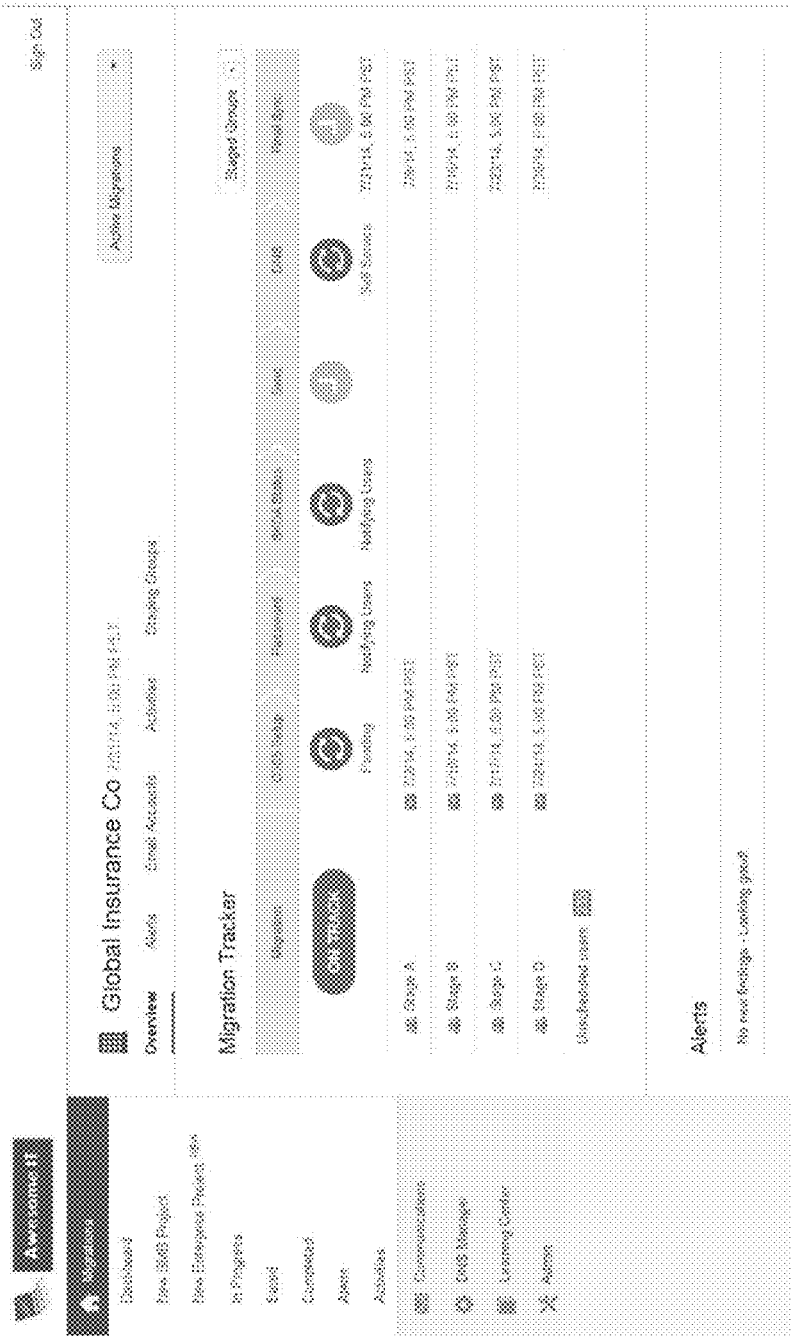
FIG. 5 is an example screenshot of a GUI for planning a staged migration according to various embodiments.

FIG. 5 shows an example screenshot of a GUI for planning a staged migration according to various embodiments. The GUI shows the overview of an in-progress migration. The migration has four stages, Stage A, B, C, and D, all scheduled to take begin on different days, and each having a different day for final synchronization to take place. The GUI also provides the ability to visualize and create, modify, or remove Alerts, Email Accounts, Activities, and Staging Groups for the migration.

FIG. 5 also shows an example screenshot of a migration dashboard of a staged migration according to various embodiments. The GUI shows the overview of a scheduled migration. The migration details shown include the scheduled time for migration, the primary domain for migration, any additional domains for migration, who the hoster of the migration is, the protocol being used, and any DNS options. The GUI also shows billing and customer information for the migration, including how the billing and communications are handled, the customer partner status and name, a link to export the migration details, and a customer product key.

Figure 6:
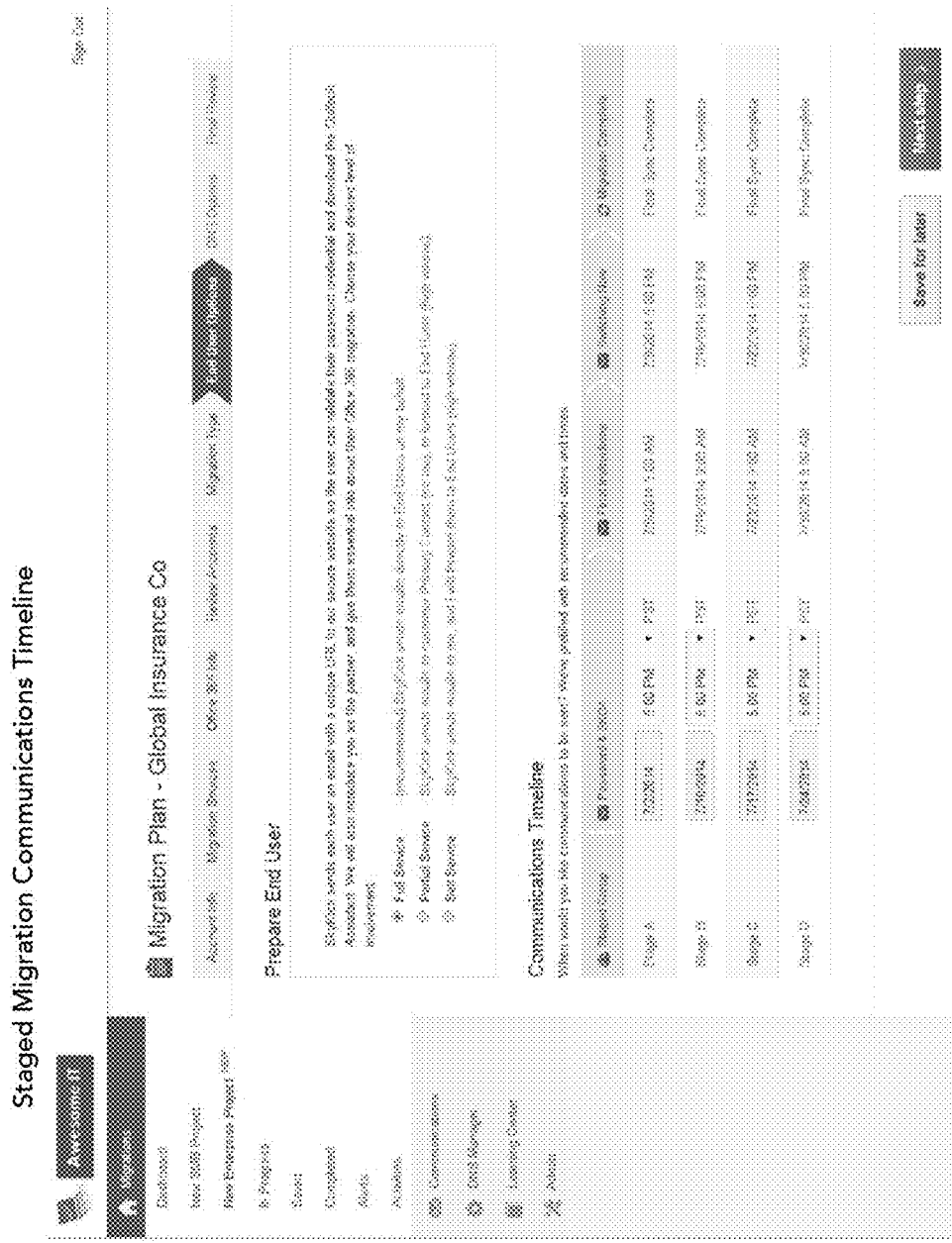
FIG. 6 is an example screenshot of a GUI for scheduling communications according to various embodiments.

FIG. 6 shows an example screenshot of a GUI for creation of a new migration plan according to various embodiments, specifically the communication options. Options for the new migration plan including how the end users are notified of the migration and how they receive instructions. The GUI also allows for the specification of a timeline for communication to the members of each staging group for various timeline elements. Separate times and communication may be sent for password and end user assistant installation, final instructions, notification that the a switch to the destination system is occurring, and that the migration is complete.

Figure 7:
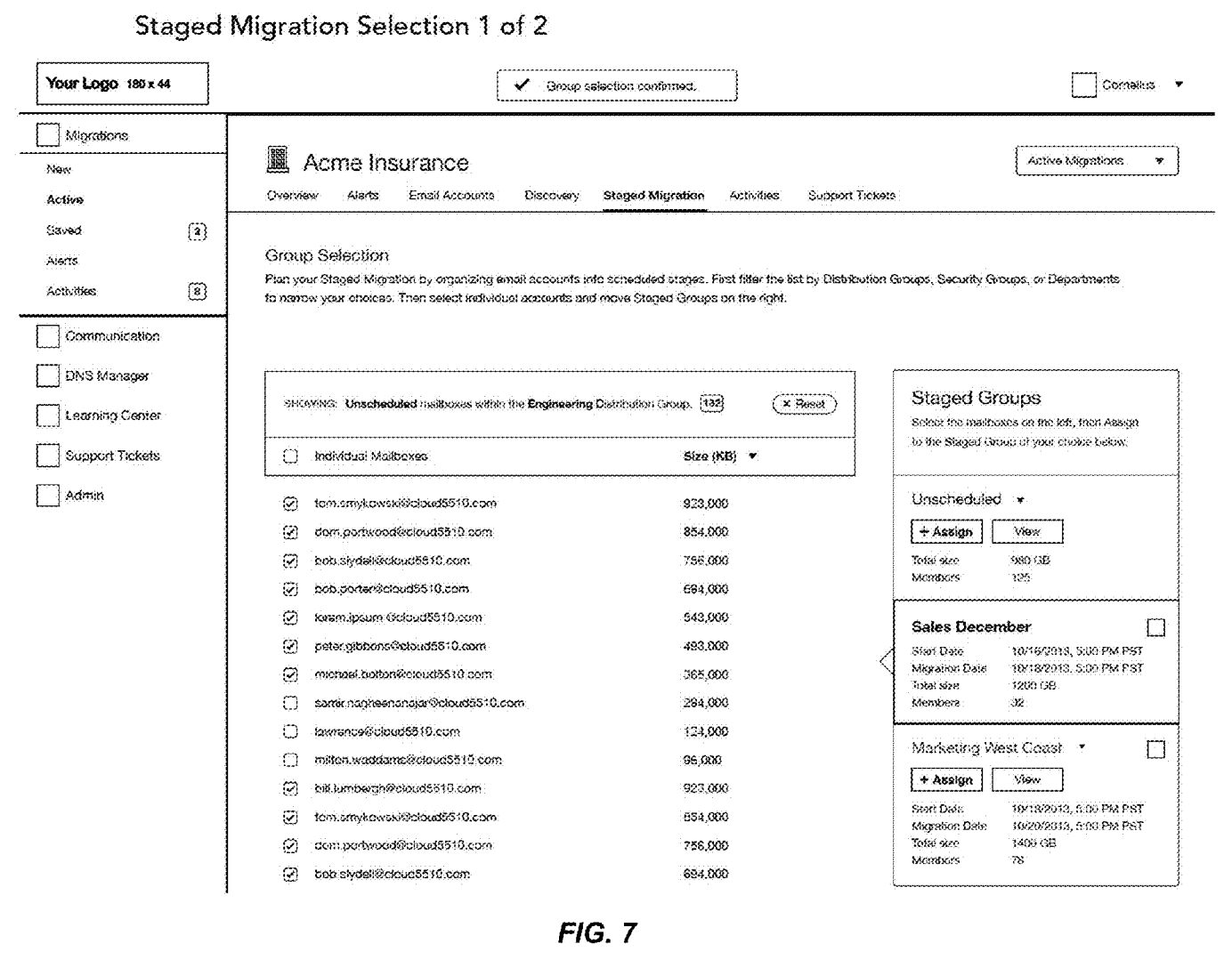

FIG. 7 shows an example screenshot of GUI for specifying which users are part of which staged migration group. The GUI allows for the creation of custom logical migration groups based on job role, location, or various other factors. The GUI may show members of each migration group and details about each member, including the size of the data to be transferred for each member of the staged migration group.

V. Migration Controller Commands

In some embodiments, migration controller 110 sends various commands (examples are described below) to other system components and other destinations via a workflow engine 116. The orchestration that is followed can be generally similar or identical regardless of what type of source system 136 is involved: the correct commands to run against the destination system 118 are identified, implemented, and integrated into the overall platform so that they are executed at the right time.

A benefit of having the migration controller 110 run these commands via the workflow engine 116 in an automated fashion in the proven-correct way is that it takes less time and is less error-prone than manual processing or batch command implementation in order to execute commands. The commands may be executed without a person ever having to be present on the premises of the source environment 120. Solutions provided by some embodiments can allow for the data of hundreds of companies to be migrated every day, with the help of relatively few employees. Some of these commands that may be run by the migration controller 110 are described below.

Those skilled in the art will appreciate that the logic described above, and in each of the flow diagrams discussed below, may be altered in various ways. For example, the order of the logic may be rearranged, subsets may be performed in parallel, illustrated logic may be omitted, other logic may be included, etc.

A. On-Premise to Cloud Migration Flow

Figure 3:
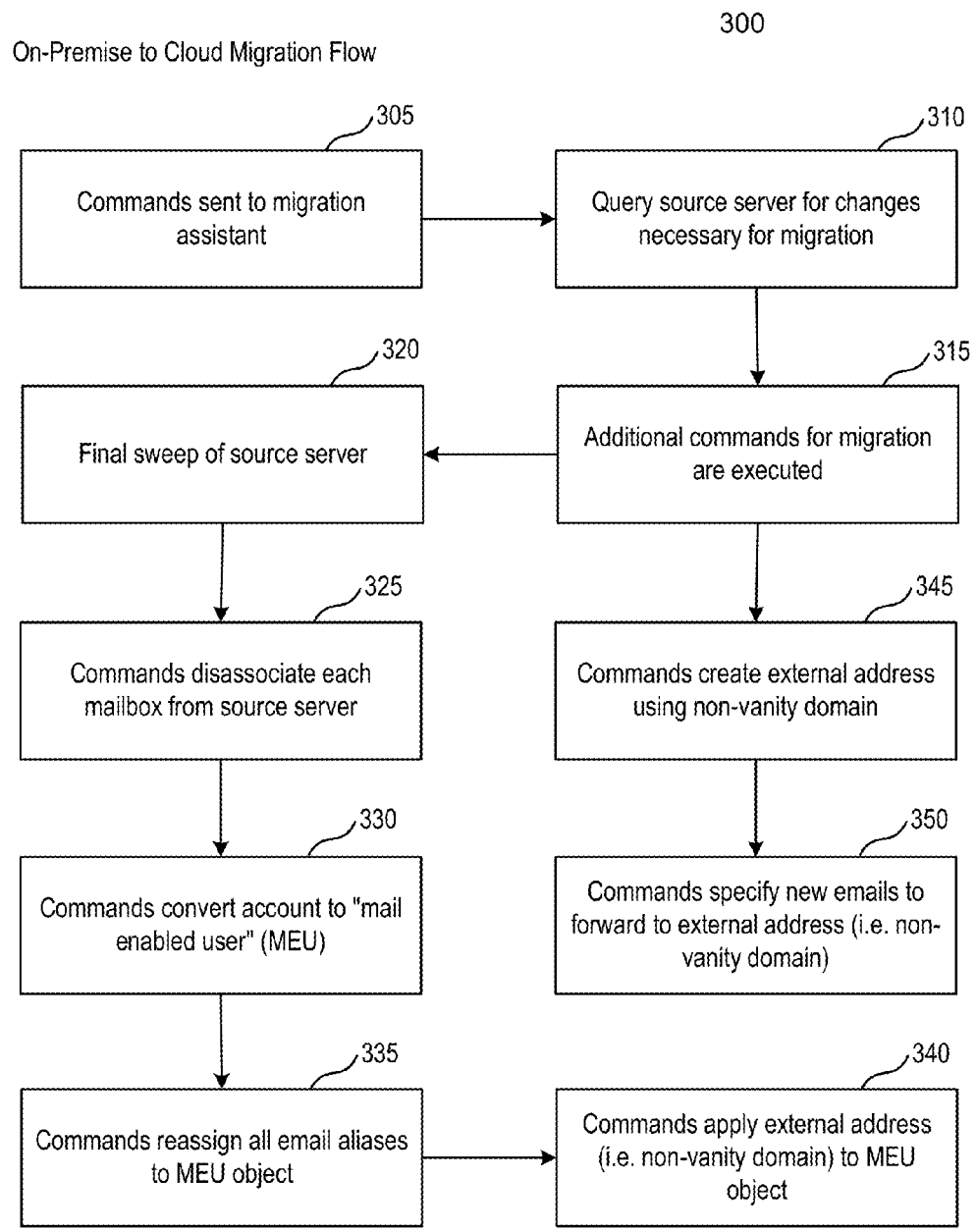
FIG. 3 is a flow diagram showing a method of migrating data from a local source system to a destination system according to various embodiments.

FIG. 3 is a flow diagram showing a method 300 to accomplish a migration from a local source system to a cloud-based destination system according to various embodiments. For example, the migration could be from an Exchange® based source system to an Office 365® destination system. Reference is made to elements of FIG. 1 for convenience.

At block 305, commands may be sent to the Migration Assistant 124 from Migration Controller 110. The commands may specify queries to be made. For example, one command may be to setup forwarding from one email mailbox account to another. Another example command could specify to query for all details of an account, for example, all aliases associated with the account.

At block 310, Migration Assistant 124 can query the Migration Controller 110 what changes need to be made to the source system 136 for the migration based on the commands. The Migration Assistant may use a polling mechanism to contact the Migration Controller to see if there are any commands for it to execute. The Migration Assistant may be behind a firewall, and as such by it polling, it can find out directly if there commands to execute instead of waiting for data that may not be receivable due to network restrictions.

At block 315, any additional commands are determined and carried out. For example, forwarding rules may need to be implemented so that every new email and other new or changed data that is received at the source system 136 is forwarded to Destination System 118. Various steps may need to be taken in order to do this; for example in the case of a Microsoft Exchange® source system, an external contact can be created at block 345, and it is specified that any new mail should be forwarded to that external contact at block 350.

At block 320, a final sweep or final synchronization may be completed by the Migration Controller 110 to get all email and data from that stage's mailboxes and data on source system 136 to Destination System 118. This may be done for each mailbox in parallel.

At block 325, each mailbox may be disassociated from the source system 136. Note that an initial sweep to get email and data from that stage's mailboxes and data storage on source system 136 onto the Destination System 118 may be conducted shortly after the start time of the staging group. The migration assistant may execute commands to perform this dissociation.

At block 330, for each mailbox, after the final sweep at block 320 and disassociation at block 325 are completed, the Migration Controller 110 may then direct the Migration Assistant 124 to run commands to convert the mailbox on the source system 136 to an online or cloud-based user mailbox, for example a "mail enabled user" (MEU). Here, a the source system 136 may comprise a Microsoft Exchange® source system) for which data is being migrated into a destination cloud-based system. The migration assistant may execute commands to perform this conversion.

At block 335, all of the user's email aliases may be reassigned to the online or cloud-based user mailbox object, so that emails sent to those aliases are deliverable.

At block 340, in the case of a Microsoft Exchange source system, the external address/contact can be set as the forwarding address of the MEU. This forwarding or "non-vanity" address may be the full internal address for the account, as opposed to an external "vanity" address, which can be through which emails can be received externally.

For some kinds of source systems, migration assistant 124 may take a form other than an application executing on the source system 136. For example, in certain embodiments, the source system 136 is given commands 405 (as shown in the flow diagram in FIG. 4) by the migration controller 110 through an API, which may be provided by the host of the source system 136 in some cases.

B. Cloud to Cloud Migration Flow

Figure 4:
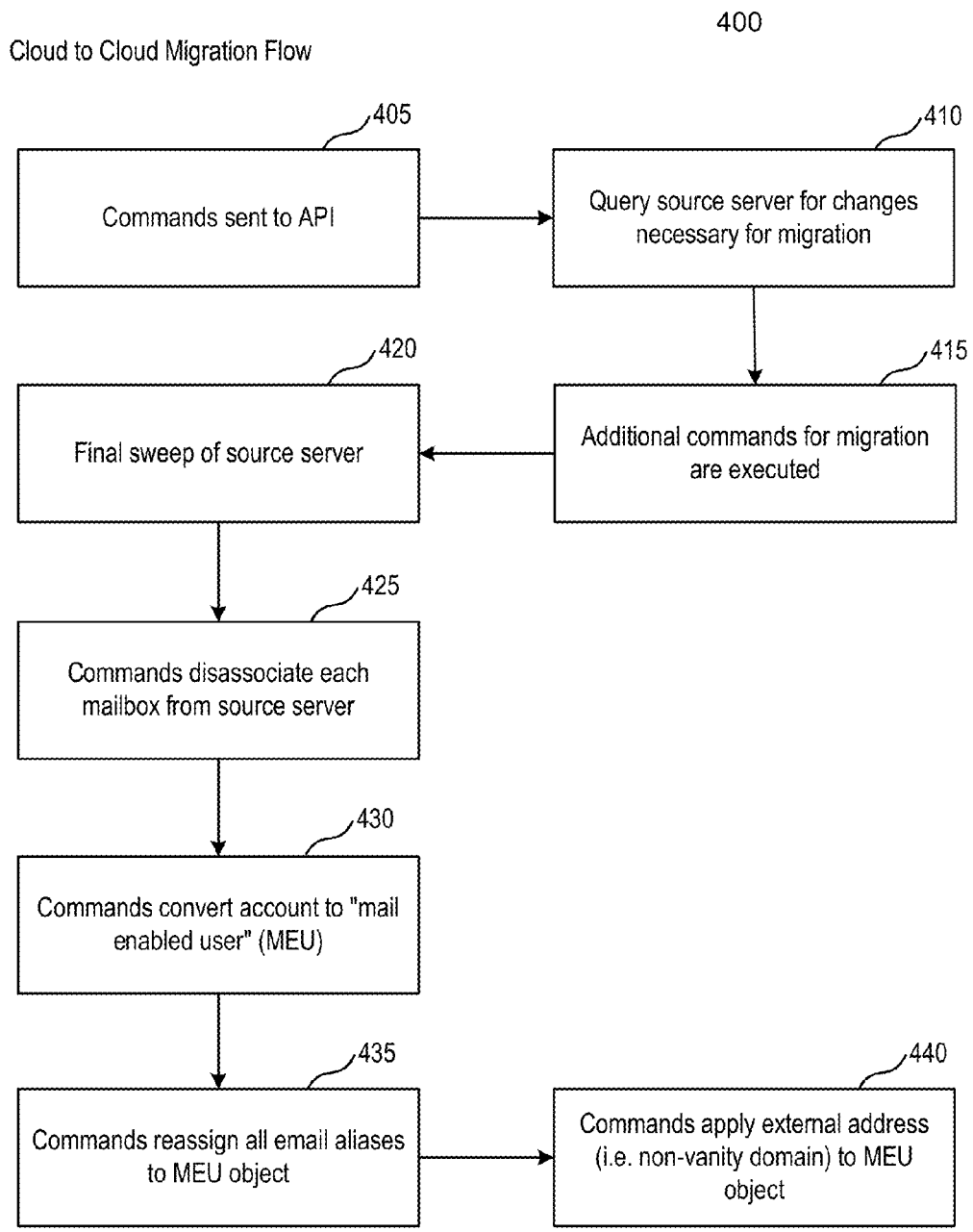
FIG. 4 is a flow diagram showing a method of migrating data from a cloud-based source system to a cloud-based destination system according to various embodiments.

FIG. 4 is a flow diagram showing a method of a migration from a cloud-based source system to a cloud-based destination system according to various embodiments. Aspects of FIG. 4 may also be used for the on-premise to cloud migration, and vice versa. FIG. 4 may be performed partially by a migration controller server, and some blocks may be performed by the source system.

At block 405, commands may be sent to the API. For example, the commands can be sent to a particular address, e.g., a particular port at a particular URL. Logic at the corresponding server can be assigned to receive and interpret commands sent via the API. The API may be implemented on a source document server or other part of the source system. Changes may be defined by workflows and turned into instructions by the migration controller.

The commands may include requests for metadata. The source system can retrieve the requested data and send the metadata to the migration controller server, which can use the metadata to determine future commands to send to the source system. Instead of, or in addition, the commands may include instructions to query the source document server for changes necessary for migration. For example, the commands may request the status of certain features, and the migration controller server can use the status to determine what changes are necessary for migration.

At block 410, the source document server can receive the query about what changes need to be made for the migration. In various embodiments, the query can include commands to make changes, or the source document server can respond to the query and receive subsequent commands to make the changes. The source document server can implement the changes to automatically prepare the source system for the migration. The commands, for example, can specify forwarding of mail and data from one account to another. As another example, a command can instruct a server to convert an on-premise mailbox into an MEU.

At block 415, additional commands can be sent by the migration controller server to the API to carry out further migration actions, and the source system can execute these commands. For example, forwarding rules and other modifications to the source system 136 may be made at block 415 through the API to ensure that the migration proceeds without interruption and does not affect the delivery of mail. The commands can specify for example which accounts are to be migrated. The commands can also specify which accounts need to be changed during or after a migration.

At block 420, a final sweep of the source system 136 may be completed. The final sweep may involve checking the source email server for any emails that have been delivered during the migration or that might be unintentionally leftover. Such emails can be migrated to the MEU account, for example, at an Office 365 account. The final sweep can compare the contents of the mailbox at this point in time with a record of what it looked like at a last sync. Any changes discovered can be applied to the destination mailbox.

At block 425, each mailbox may be disassociated from the source system 136. When the mailbox is disassociated from the source system, the account may be removed or deactivated from the document server, such as an Exchange server, e.g., as it can be associated with an MEU instead. The source system can send mail to the MEU instead of the on-premise mailbox.

At block 430, the migration controller 110 may direct the API to run commands to convert the mailbox on the source system 136 to an MEU when the source system is a Microsoft Exchange® source system. In other embodiments, other commands can establish the equivalent for other systems.

At block 435, all of the user's aliases are reassigned to the MEU object, so that no emails sent to those aliases go undelivered. The user may have one or more aliases at the source system mail server, for example a Microsoft Exchange® source system mail server. Those aliases from Exchange are reassigned to the MEU object.

At block 440, an external address is applied to the MEU object. Application of the external address can include applying any forwarding rules on the MEU. In a staged migration, a subset of all users can be migrated at each time. All mail that used be directed for a user that has been migrated. The DNS may not be changed until the migration is complete, and as such forwarding rule are applied to make sure that email is properly delivered for the MEU user. Mail can still come to the original, on-premise mail server, but then forwarded to the MEU account via a forwarding rule. Thus, before the migration is complete, all mail can still come to an Exchange mail server, for example. However, for accounts that have been migrated to an MEU at, for example, Office 365, forwarding rules need to be in place until the migration is complete.

The changes to the source system 136 outlined above can be time-sensitive, as email or other data may be received at the source system 136 and not forwarded to the Destination System 118 if the changes are not completed as directed in the following example. For a stage whose migration time is at 5 PM, then at 5 PM the forwarding rules for each mailbox in the stage are set up and the final synchronization for each mailbox begin.

In some embodiments the final synchronization for each mailbox can happen in parallel with each other. For each mailbox included in a stage, when the final synchronization is completed, the mailbox can be converted to an MEU. Because the final synchronization for each mailbox may take different amounts of time to finish, MEU conversions may also begin at different times (but can also run in parallel). Final synchronization can capture any relevant changes to settings or new email that occurred between the initial migration time and the time that migration finished at source system 136 for each End User System 132.

The automation of this process offered by embodiments can simplify the data migration process for those in charge of carrying it out, since manually performing the steps can be time consuming, stressful, and prone to human error because of the amount of work involved to complete the steps, especially for large migration stages. Further, the automation and timing/sequencing of this process helps to avoid data loss, and email downtime, and ensures complete migration fidelity since all selected data may be migrated without error.

As a safety net, some embodiments may perform various procedures to ensure that email is forwarded to the destination system 118. For example, the migration controller 110 may reconnect to the source system 136 at intervals (e.g. once every 5 minutes) to determine if any emails were received and not forwarded to the destination system 118. If so, they may be replicated to the destination system 118. This may be performed until all forwarding rules are applied to the source system 136 (and after the rules are applied as well). Without the automation provided by the various embodiments, manually performing this process would be futile in many situations, because in the time it would take to do this for every end user in a stage, more email may be received at the source system 136 for those end users.

The migration controller 110 may also connect to the destination system 118 and send various commands to it. For example, the migration controller 110 may direct the destination system 118 to create a mail flow rule and an outbound connection to the source system 136 so that any mail that is sent from an end user whose mailbox resides on the destination system 118 and is bound for another end user on the same domain is routed back to the source system 136. The mail flow rule may be needed when not all users have been migrated to the destination system.

In order for a user on the destination system to be able to mail a recipient user that whose mailbox and other data is still on the source server, certain mail flow rules may need to be put in place, or the mail may not be deliverable.

Without the mail flow rule, the system would attempt to deliver mail to the destination system when there is no account yet, as the recipient's data and mail is still at the source system. The mail flow rule may be an outbound connector that specifies that for the recipient to deliver mail at the source system and not the destination system The source system 136 can then deliver it to the correct mailbox. This command is implemented so that end users who have been migrated to the destination system 118 are able to email end users still on the source system 136 without an error related to the migration. This can be beneficial for properly delivering internal emails sent directly from end users who have been migrated to the destination system 118 to those end users still on the source system 136. Once all accounts have been migrated to the destination system, the mail flow rules are removed, and instead forwarding rules to an destination system account such as an online account for example an MEU account.

VI. Computer System

Figure 9:
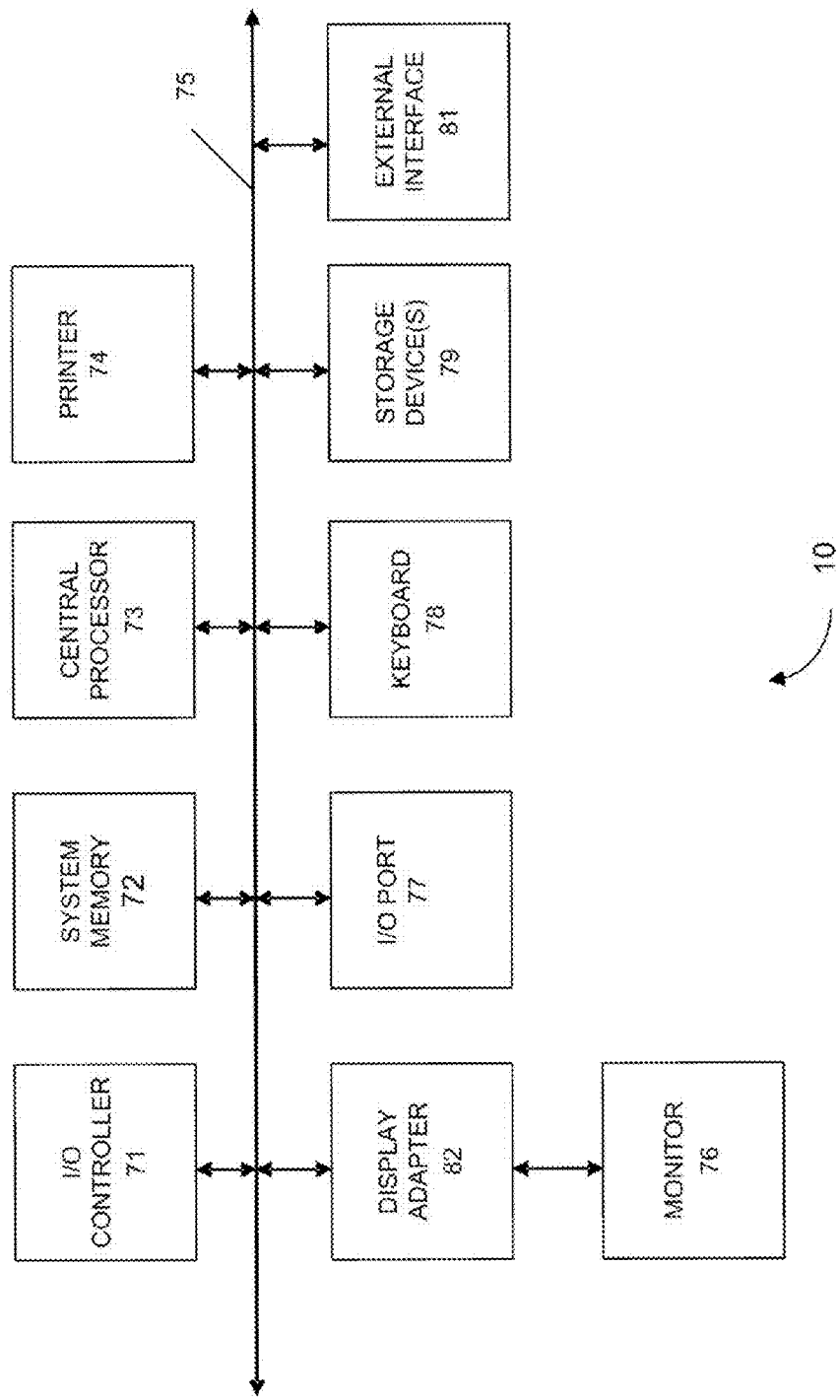
FIG. 9 shows a block diagram of an example computer system 10 usable with system and methods according to various embodiments.

Any of the computer systems mentioned herein may utilize any suitable number of subsystems. Examples of such subsystems are shown in FIG. 9 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 9 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to various embodiments may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner. However, other embodiments may be directed to specific embodiments relating to each individual aspect, or specific combinations of these individual aspects.

The above description of exemplary embodiments has been presented for the purposes of illustration and description. It is not intended to be exhaustive or to limit the invention to the precise form described, and many modifications and variations are possible in light of the teaching above. The embodiments were chosen and described to best explain principles and their practical applications.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method of migrating data from a plurality of user accounts from a source system to a destination system, the method comprising:
   receiving, at a migration controller server, instructions to migrate the user accounts in a plurality of stages, wherein each stage migrates a different set of one or more user accounts, wherein a first stage starts at a first start time and is completed by a first end time;
   at the first start time:
      sending, by the migration controller server, migration commands to a migration engine to begin replicating the data of a first set of one or more user accounts from the source system to the destination system;
   receiving, by the migration controller server, a completion signal from the migration engine at the first end time, the completion signal indicating that the first set of one or more user accounts have been migrated;
   in response to the completion signal:
      transmitting, by the migration controller server, forwarding commands to the source system to create forwarding rules to forward future data for the first set of one or more user accounts to the destination system, the future data being received by the source system after the first set of one or more user accounts have been migrated to the destination system; and
   sending, by the migration controller server, reconfigure commands to a first set of client computers for execution by a migration assistant executing on the source system, the first set of client computers being associated with the first set of one or more user accounts, and the migration assistant being configured to execute the reconfigure commands to automatically reconfigure each of the first set of client computers to connect to the destination system.

2. The method of claim 1, wherein the reconfigure commands instruct the migration assistant to point change one or more settings of one or more client application to point to the destination system.

3. The method of claim 1, further comprising:
   between the first start time and the first end time:
      identifying, by the migration engine, new data that is added to the source system for the first set of one or more user accounts, and
      replicating, by the migration engine, the new data to the destination system using the migration controller server.

4. The method of claim 3, wherein identifying new data is performed at a plurality of times.

5. The method of claim 4, wherein the plurality of times include the first end time.

6. The method of claim 1, further comprising:
   in response to the completion signal:
      sending, by the migration controller server to the source system, a command to disassociate each of the user accounts from the source system.

7. The method of claim 1, wherein the first set of one or more user accounts are email accounts, the method further comprising:
   in response to the completion signal:
      sending, by the migration controller server to the source system, one or more commands to convert the first set of one or more user accounts to mail-enabled user accounts.

8. The method of claim 7, further comprising:
   sending, by the migration controller server to the source system, one or more additional commands to:
      apply an external address to the mail-enabled user account; and
      reassign user aliases of a user account to the respective mail-enabled user account.

9. The method of claim 1, further comprising:
   querying, by the migration controller server, the source system to obtain information to identify changes necessary for a migration project; and
   sending, by the migration controller server, commands to the source system to implement the changes.

10. The method of claim 1, wherein replicating the data from the source system to the destination system includes:
    sending commands from the migration controller server to a migration assistant executing on a local device within a local network that includes the source system.

11. The method of claim 1, wherein a second stage starts at a second start time and is to be completed by a second end time, the method further comprising performing, by the migration controller server:
    at the second start time, begin replicating the data of a second set of user accounts from the source system to the destination system;
    between the second start time and the second end time, identifying new data that is added to the source system and replicating the new data to the destination system;
    at the second end time, creating forwarding rules to forward future data for the second set of user accounts to the destination system; and
    sending commands to a second set of client computers associated with the second set of user accounts to reconfigure the second set of client computers to connect to the destination system.

12. A non-transitory computer readable medium storing a code for controlling a migration controller server to perform an operation for migrating data from a plurality of user accounts from a source system to a destination system, the code comprising:
    receiving instructions to migrate the user accounts in a plurality of stages, wherein each stage migrates a different set of one or more user accounts, wherein a first stage starts at a first start time and is completed by a first end time;
    at the first start time:
    sending migration commands to a migration engine to begin replicating the data of a first set of one or more user accounts from the source system to the destination system;
    receiving a completion signal from the migration engine at the first end time, the completion signal indicating that the first set of one or more user accounts have been migrated;
    in response to the completion signal: transmitting forwarding commands to the source system to create forwarding rules to forward future data for the first set of one or more user accounts to the destination system, the future data being received by the source system after the first set of one or more user accounts have been migrated to the destination system;
    and sending reconfigure commands to a first set of client computers for execution by a setup assistant executing on each of the first set of client computers, the first set of client computers being associated with the first set of one or more user accounts, and the setup assistant being configured to execute the reconfigure commands to automatically reconfigure each of the first set of client computers to connect to the destination system.

13. The computer product of claim 12, wherein the reconfigure commands instruct the setup assistant to point change one or more settings of one or more client applications to point to the destination system.

14. The computer product of claim 12, wherein the instructions further comprise: between the first start time and the first end time: identifying, by the migration engine, new data that is added to the source system for the first set of one or more user accounts, and replicating, by the migration engine, the new data to the destination system using the migration controller server.

15. The computer product of claim 12, wherein the first set of one or more user accounts are email accounts, and wherein the instructions further comprise: in response to the completion signal: sending, by the migration controller server to the source system, one or more commands to convert the first set of one or more user accounts to mail-enabled user accounts.

16. The computer product of claim 15, wherein the instructions further comprise: sending, by the migration controller server to the source system, one or more additional commands to: apply an external address to a mail-enabled user account; and reassign user aliases of a user account to the respective mail-enabled user account.

17. The computer product of claim 12, wherein replicating the data from the source system to the destination system includes sending commands from the migration controller server to a migration assistant executing on a local device within a local network that includes the source system.

18. The computer product of claim 12, wherein a second stage starts at a second start time and is to be completed by a second end time, wherein the instructions further comprise: at the second start time, begin replicating the data of a second set of user accounts from the source system to the destination system; between the second start time and the second end time, identifying new data that is added to the source system and replicating the new data to the destination system; at the second end time, creating forwarding rules to forward future data for the second set of user accounts to the destination system; and sending commands to a second set of client computers associated with the second set of user accounts to reconfigure the second set of client computers to connect to the destination system.

* * * * *